United States Patent
Yamasaki et al.

(10) Patent No.: US 9,859,969 B2
(45) Date of Patent: Jan. 2, 2018

(54) RELAY APPARATUS AND METHOD OF CONTROLLING RELAY APPARATUS

(71) Applicant: Panasonic Intellectual Property Management Co., Ltd., Osaka (JP)

(72) Inventors: Akira Yamasaki, Osaka (JP); Nobuhiko Arashin, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 143 days.

(21) Appl. No.: 14/930,696

(22) Filed: Nov. 3, 2015

(65) Prior Publication Data
US 2016/0056880 A1    Feb. 25, 2016

Related U.S. Application Data

(63) Continuation of application No. PCT/JP2014/002507, filed on May 13, 2014.

(30) Foreign Application Priority Data

Jun. 14, 2013    (JP) .................................. 2013-125364

(51) Int. Cl.
*H04B 7/15* (2006.01)
*H04W 88/04* (2009.01)
(Continued)

(52) U.S. Cl.
CPC ................. *H04B 7/15* (2013.01); *H04L 1/20* (2013.01); *H04W 84/047* (2013.01);
(Continued)

(58) Field of Classification Search
CPC ... H04W 84/047; H04W 88/08; H04W 40/22; H04W 52/46; H04W 88/04
See application file for complete search history.

(56) References Cited

U.S. PATENT DOCUMENTS

| | | | |
|---|---|---|---|
| 6,493,540 B1 | 12/2002 | Suzuki | |
| 8,254,928 B2 * | 8/2012 | Watanabe | H04W 36/30 455/414.1 |

(Continued)

FOREIGN PATENT DOCUMENTS

| | | |
|---|---|---|
| JP | 09-098176 | 4/1997 |
| JP | 10-145278 | 5/1998 |

(Continued)

OTHER PUBLICATIONS

International Search Report dated Aug. 19, 2014 in International (PCT) Application No. PCT/JP2014/002507.

(Continued)

*Primary Examiner* — Raj Jain
(74) *Attorney, Agent, or Firm* — Wenderoth, Lind & Ponack, L.L.P.

(57) ABSTRACT

A relay apparatus of the present disclosure is a relay apparatus which is connected to a host apparatus by a first communication method and to a terminal apparatus by a second communication method, and which transmits data to the terminal apparatus and receives data from the terminal apparatus in accordance with an instruction from the host apparatus, the relay apparatus including a communication quality measuring unit which extracts communication quality of the second communication method, a packet processor which detects an error in connection with the terminal apparatus, and an error transmission determining unit which changes timing of notifying the host apparatus of the error detected in the packet processor in accordance with the communication quality extracted in the communication quality measuring unit.

3 Claims, 7 Drawing Sheets

(51) Int. Cl.
    *H04W 88/08*    (2009.01)
    *H04W 84/04*    (2009.01)
    *H04L 1/20*      (2006.01)
    *H04L 1/00*      (2006.01)

(52) U.S. Cl.
    CPC ........... *H04W 88/04* (2013.01); *H04W 88/08* (2013.01); *H04L 2001/0094* (2013.01)

(56) References Cited

U.S. PATENT DOCUMENTS

| | | | |
|---|---|---|---|
| 2002/0054578 A1 | 5/2002 | Zhang et al. | |
| 2002/0089927 A1 | 7/2002 | Fischer et al. | |
| 2002/0089959 A1 | 7/2002 | Fischer et al. | |
| 2002/0089994 A1 | 7/2002 | Leach, Jr. et al. | |
| 2006/0056492 A1 | 3/2006 | Honda | |
| 2006/0251086 A1 | 11/2006 | Ha et al. | |
| 2009/0074083 A1 | 3/2009 | Wakutsu | |
| 2011/0078531 A1* | 3/2011 | Umeda | H04L 1/0016 714/751 |
| 2013/0003597 A1* | 1/2013 | Fukumasa | H04W 24/10 370/252 |
| 2014/0329553 A1* | 11/2014 | Nakashima | H04W 52/365 455/522 |
| 2016/0056880 A1* | 2/2016 | Yamasaki | H04B 7/15 370/315 |

FOREIGN PATENT DOCUMENTS

| | | |
|---|---|---|
| JP | 2000-175247 | 6/2000 |
| JP | 3341106 | 11/2002 |
| JP | 2005-333547 | 12/2005 |
| JP | 2006-086856 | 3/2006 |
| JP | 2007-266875 | 10/2007 |
| JP | 4376698 | 12/2009 |

OTHER PUBLICATIONS

"Defining the Future of Multi-Gigabit Wireless Communications", WiGigWhitepaper_FINALS, Wireless Gigabit Alliance, Jul. 26, 2010, pp. 1-5.

* cited by examiner

RELAY APPARATUS AND METHOD OF CONTROLLING RELAY APPARATUS

1. FIELD OF THE INVENTION

The present disclosure relates to a relay apparatus which receives a command from a host apparatus to control a terminal apparatus, and a method of controlling the relay apparatus.

2. DESCRIPTION OF THE RELATED ART

When a host apparatus accesses a terminal apparatus through a relay apparatus, the host apparatus accesses the terminal apparatus through two types of communication, that is, communication between the host apparatus and the relay apparatus, and communication between the relay apparatus and the terminal apparatus.

In PTL 1, there is a disclosed technique in which a mobile phone replicates internal data to another device in an unstable communication environment of wireless quality, and suppresses to replicates internal data in a stable communication environment of wireless quality.

CITATION LIST

Patent Literature

PTL 1: Unexamined Japanese Patent Publication No. 2005-333547

SUMMARY OF THE INVENTION

A relay apparatus of the present disclosure is a relay apparatus which is connected to a host apparatus by a first communication method and to a terminal apparatus by a second communication method, and which transmits data to the terminal apparatus and receives data from the terminal apparatus in accordance with an instruction from the host apparatus, the relay apparatus including a communication quality measuring unit configured to extract communication quality of the second communication method, a packet processor configured to detect an error in connection with the terminal apparatus, and an error transmission determining unit configured to change timing of notifying the host apparatus of the error in accordance with the communication quality extracted in the communication quality measuring unit.

This constitution enables the host apparatus, which has been notified of the error, to retransmit a command of reading data to the relay apparatus at better timing without grasping a communication state between the relay apparatus and the terminal apparatus.

DETAILED DESCRIPTION OF THE PREFERRED EMBODIMENT

Hereinafter, with reference to the drawings as needed, an exemplary embodiment will be described in detail. However, an unnecessary detailed description may be omitted. For example, a detailed description of a well-known item and a redundant description of substantially the same configuration may be omitted. This is to avoid unnecessary redundancy in the following description and to facilitate understanding of those in the art.

The accompanying drawings and the following description are provided for those in the art to sufficiently understand the present disclosure, and are not intended to limit the subject of claims.

Figure 1:
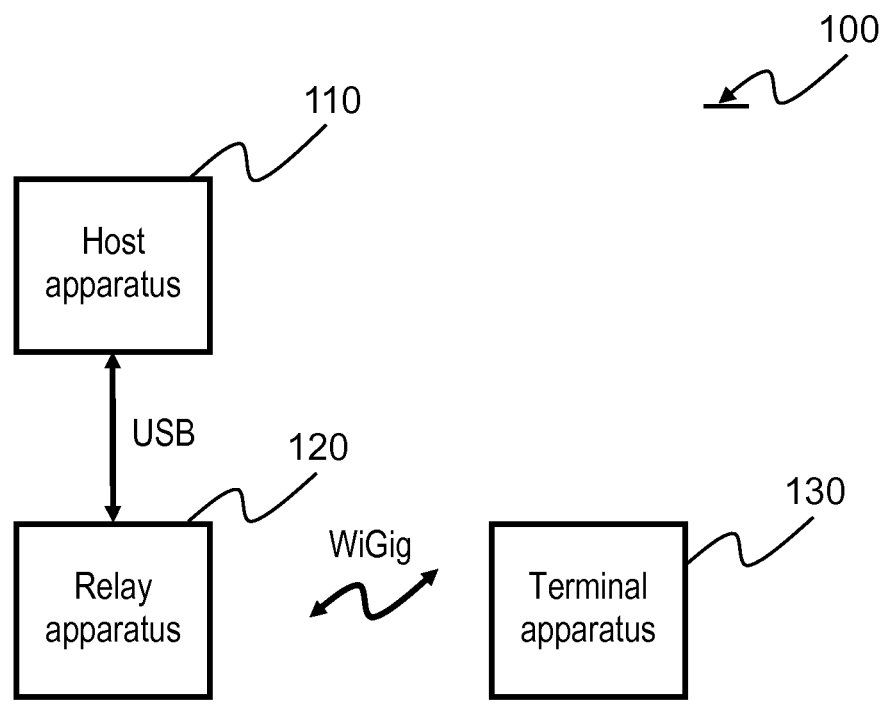
FIG. 1 shows a configuration diagram of a communication system according to an exemplary embodiment.

FIG. 1 shows a configuration diagram of communication system 100 described in the present exemplary embodiment. Communication system 100 includes host apparatus 110, relay apparatus 120, and terminal apparatus 130.

Host apparatus 110 is connected to relay apparatus 120 with a Universal Serial Bus (USB) protocol. Moreover, relay apparatus 120 establishes connection with terminal apparatus 130 in Wireless Gigabit (WiGig). The above-described connection allows host apparatus 110 to communicate data with terminal apparatus 130 through relay apparatus 120.

While in the present exemplary embodiment, the communication system in FIG. 1 will be described as an example, the present disclosure is not limited to the example. Any communication system may be configured in configuration other than in FIG. 1, as long as the present disclosure is applicable. That is, a communication system may be a configuration in which host apparatus 110 and relay apparatus 120 are connected by a first communication method, and relay apparatus 120 and terminal apparatus 130 are connected by a second communication method. And the first communication method and the second communication method are different. As combination of the first communication method and the second communication method, for example, the first communication method may be a wired communication method, and the second communication method may be a wireless communication method. Particularly, as the second communication method, for example, a high-speed and short-distance wireless communication method such as WirelessHD (registered trademark) may be used.

In communication system 100 described in the present exemplary embodiment, reliability of the first communication method between host apparatus 110 and relay apparatus 120 may be higher than reliability of the second communication method between relay apparatus 120 and terminal apparatus 130.

Figure 2:
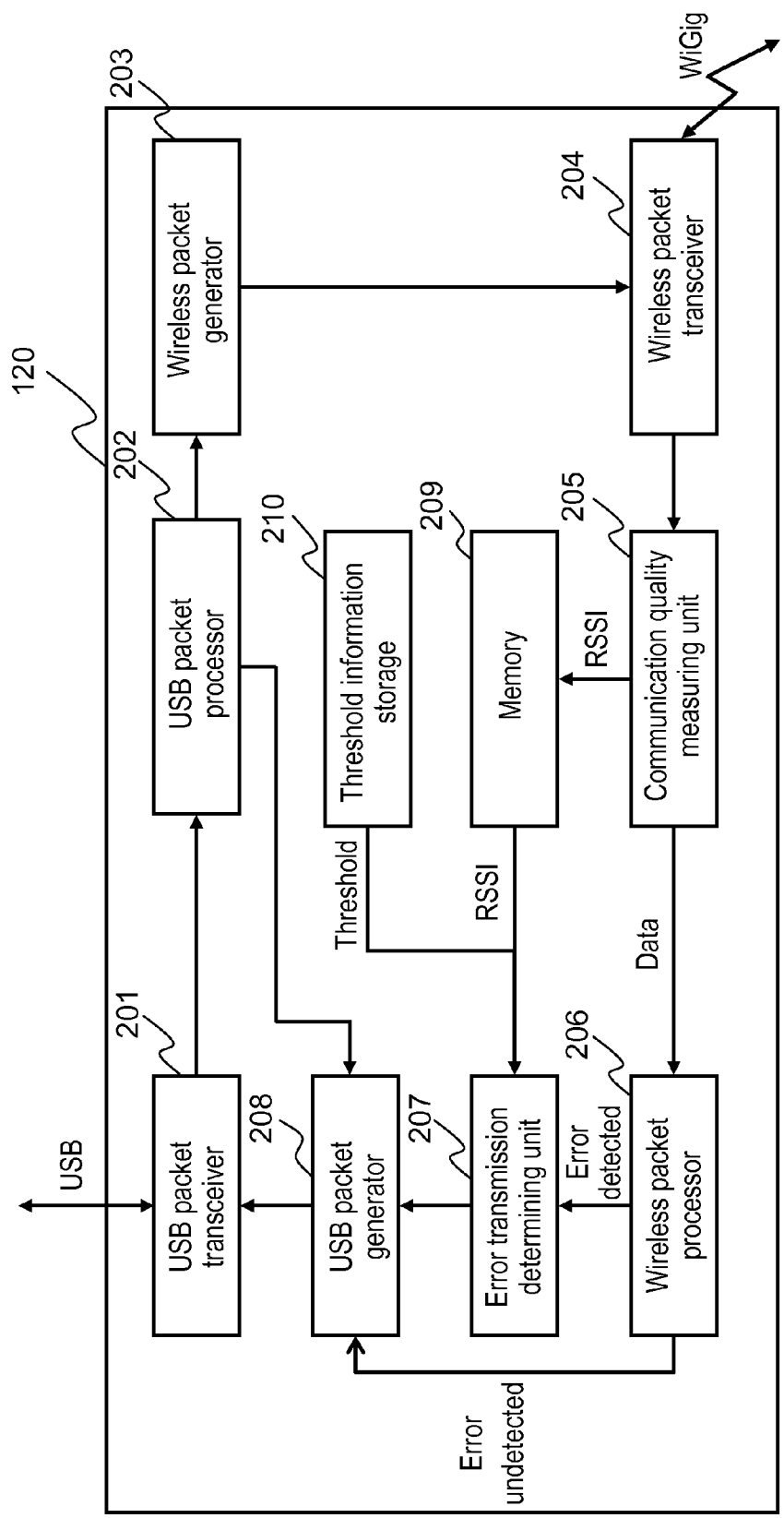
FIG. 2 shows a configuration diagram of a relay apparatus according to the exemplary embodiment.

FIG. 2 shows a configuration diagram of relay apparatus 120. Relay apparatus 120 includes USB packet transceiver 201, USB packet processor 202, wireless packet generator 203, wireless packet transceiver 204, communication quality measuring unit 205, wireless packet processor 206, error transmission determining unit 207, USB packet generator 208, memory 209, and threshold information storage 210.

USB packet transceiver 201 transmits a USB signal from relay apparatus 120 to host apparatus 110. USB packet transceiver 201 receives a USB signal from host apparatus 110. USB packet transceiver 201 includes USB interface, USB signal control circuit, and the like.

USB packet processor 202 extracts logical data from the USB signal received by USB packet transceiver 201 and processes the logical data. Specifically, the above-mentioned processing includes processing of a request packet of a USB descriptor for requesting characteristics of the device and attributes of the device to make host apparatus 110 properly recognize relay apparatus 120, processing of a Command Block Wrapper (CBW) which is a driver program to recognize connected relay apparatus 120 as a storage device and control, and which uses for transmitting a command in a USB mass storage class, and so on. Moreover, USB packet processor 202 decides whether an interface to output a packet is WiGig which is a wireless interface, or USB interface, based on the received USB packet. USB packet processor 202 transmits a request for generating a packet to the selected interface, specifically wireless packet generator 203 or USB packet generator 208.

When receiving the request for generating a packet from USB packet processor 202, wireless packet generator 203 generates a wireless packet to be transmitted to terminal apparatus 130 in accordance with a USB command and data received by USB packet transceiver 201 from host apparatus 110.

Wireless packet transceiver 204 converts the packet generated by wireless packet generator 203 to a wireless signal and transmits the wireless signal. Moreover, wireless packet transceiver 204 receives a wireless signal of a wireless packet transmitted from terminal apparatus 130. Wireless packet transceiver 204 includes an antenna to transmit and receive the wireless signal, a wireless signal control circuit, and the like.

Communication quality measuring unit 205 extracts, from the received wireless packet, communication quality when wireless packet transceiver 240 receives the wireless signal. Here, the communication quality may result from digitizing strength of the received wireless signal by a predetermined indexing method, or the like. Specifically, an index is a Received Channel Power Indicator (RCPI), a Received Signal Strength Indicator (RSSI), or the like. Besides this, an error correction rate of data restored from a received wireless wave or the like may be used. In the present exemplary embodiment, a description will be given, using the RSSI. Communication quality measuring unit 205 stores the measured RSSI in memory 209. Communication quality measuring unit 205 includes wireless control circuit such as tuner and the like, arithmetic operation unit which controls wireless control circuit, and software executed on arithmetic operation unit, and so on.

Wireless packet processor 206 extracts a packet by demodulating the received wireless signal and processes logical data included in the packet. Wireless packet processor 206 restores a packet which is divided into predetermined units during the wireless communication. Wireless packet processor 206 identifies terminal information and data included in the packet to perform processing in accordance with the data.

Wireless packet processor 206 determines error of the received packet, based on a Packet Sequence Number (PSN) included in the packet and a value of a timer. If the packet is determined to be an error, wireless packet processor 206 requests an error processing to error transmission determining unit 207. Furthermore, a case where the wireless packet is not transmitted within communication response latency is also determined to be an error. This "communication response latency" is an upper limit of latency for receiving a WiGig packet, specified in relay apparatus 120. On the other hand, if the packet is determined not to be an error, wireless packet processor 206 requests, to USB packet generator 208, transmission processing of the packet to host apparatus 110 to transmit terminal information, the data, and the like included in the packet to host apparatus 110 based on the received packet. Wireless packet processor 206 includes an arithmetic operation unit, software, and the like.

When the error processing is requested from wireless packet processor 206, error transmission determining unit 207 determines timing for notifying host apparatus 110 of an error, based on the information of the RSSI stored in memory 209 by communication quality measuring unit 205, and threshold information of the RSSI stored in threshold information storage 210. Error transmission determining unit 207 instructs USB packet generator 208 to generate a packet for notifying the error at the determined timing.

Here, when host apparatus 110 and relay apparatus 120 are connected via the USB, the packet for notifying the error is a CSW (Command Status Wrapper) which is specified in the USB mass storage class. A Status field of a CSW (Command Status Wrapper) is used to notify that a command has succeeded or failed. The Status field is set to "Failed (0x01)" or "Phase Error (0x02)" indicating a failure.

A practical procedure of notifying the error from relay apparatus 120 to host apparatus 110 is not limited thereto. A procedure of notifying the error from relay apparatus 120 to host apparatus 110 may be a procedure specified a communication protocol between relay apparatus 120 and host apparatus 110.

USB packet generator 208 generates a USB packet to be transmitted from USB packet transceiver 201, based on each of the requests for generating a packet from USB packet processor 202, wireless packet processor 206, and error transmission determining unit 207. The generated USB packet is transmitted to USB packet transceiver 201 and to be transmitted to host apparatus 110. USB packet generator 208 includes an arithmetic operation unit and software.

Memory 209 stores the information of the RSSI extracted in communication quality measuring unit 205. The information of the RSSI stored by memory 209 is used to determine when error transmission determining unit 207 notifies host apparatus 110 of the error. Memory 209 includes a storage device such as a ROM and a RAM.

Threshold information storage 210 stores the threshold information of the RSSI used as a criterion when error transmission determining unit 207 determines timing for notifying host apparatus 110 of the error. Error transmission determining unit 207 compares the information of the RSSI stored in memory 209, and the threshold information of the RSSI stored in threshold information storage 210 to decide the timing of notifying the error. Threshold information storage 210 includes a ROM, an EERROM, a flash memory, or the like.

Figure 3:
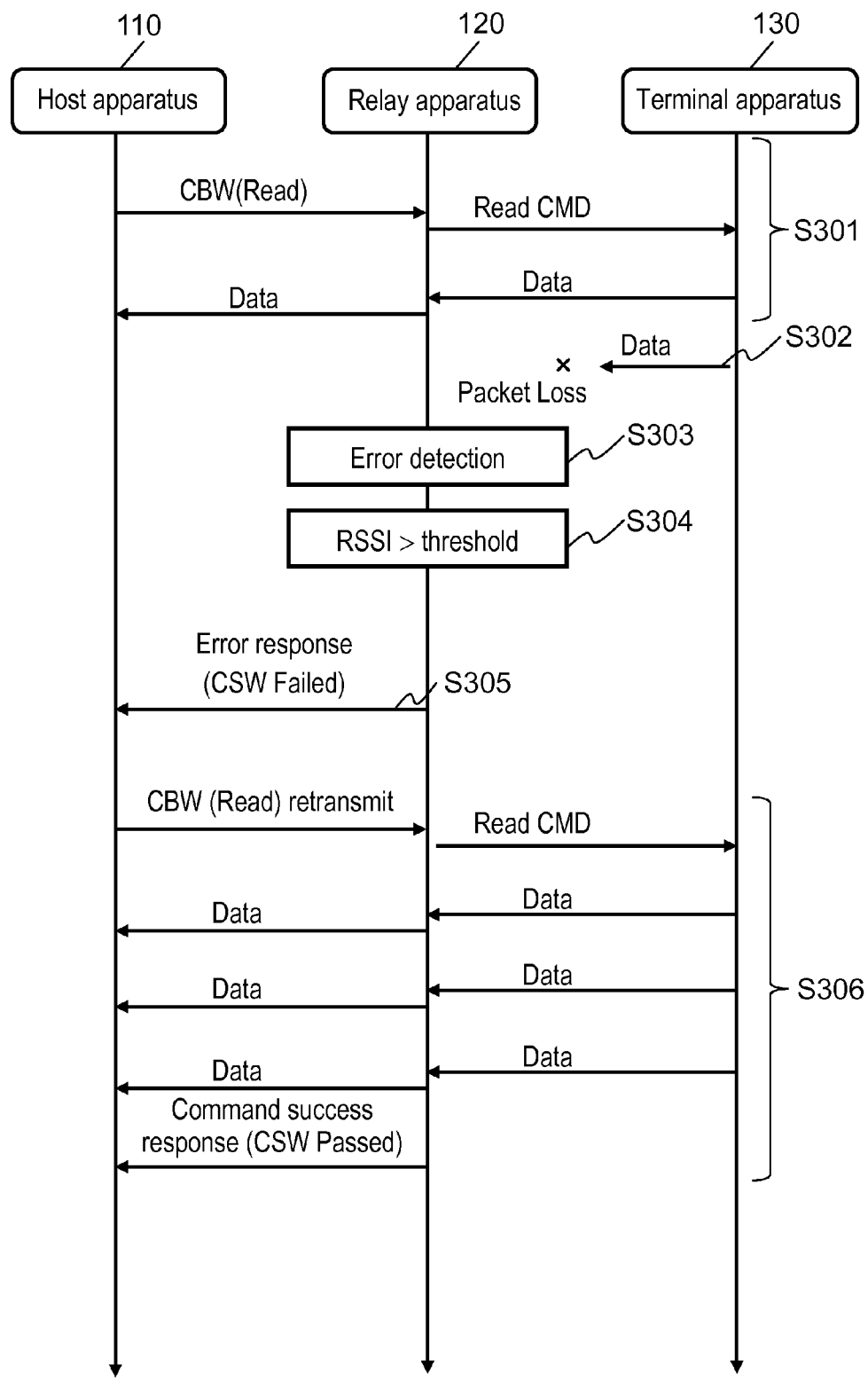
FIG. 3 shows a sequence diagram in which the relay apparatus according to the exemplary embodiment notifies a host apparatus of an error in a case where communication quality is improved immediately after detecting the error.
Figure 4:
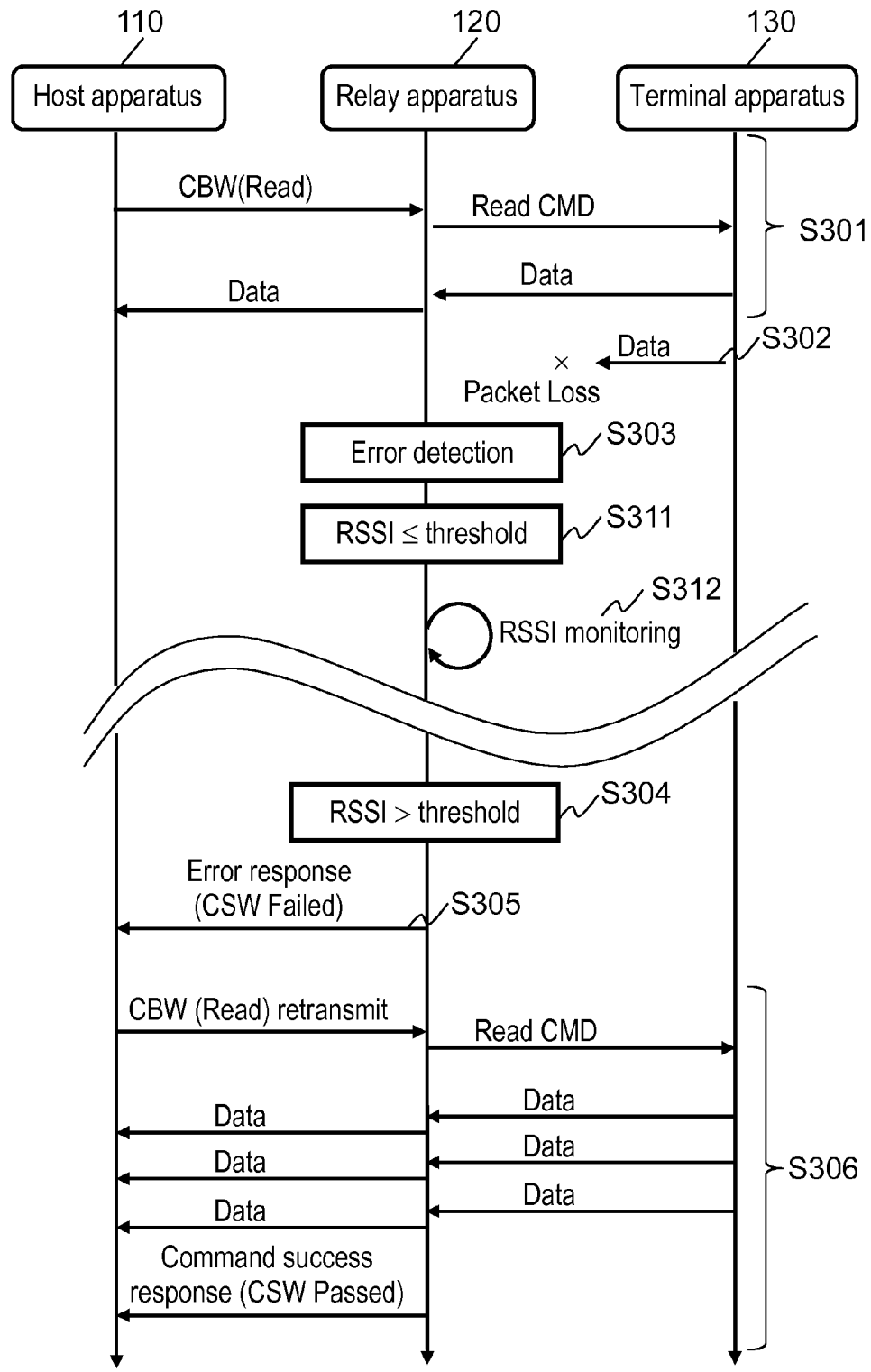
FIG. 4 shows a sequence diagram in which the relay apparatus according to the exemplary embodiment notifies the host apparatus of an error in a case where communication quality is improved after a predetermined period has elapsed after detecting the error.
Figure 5:
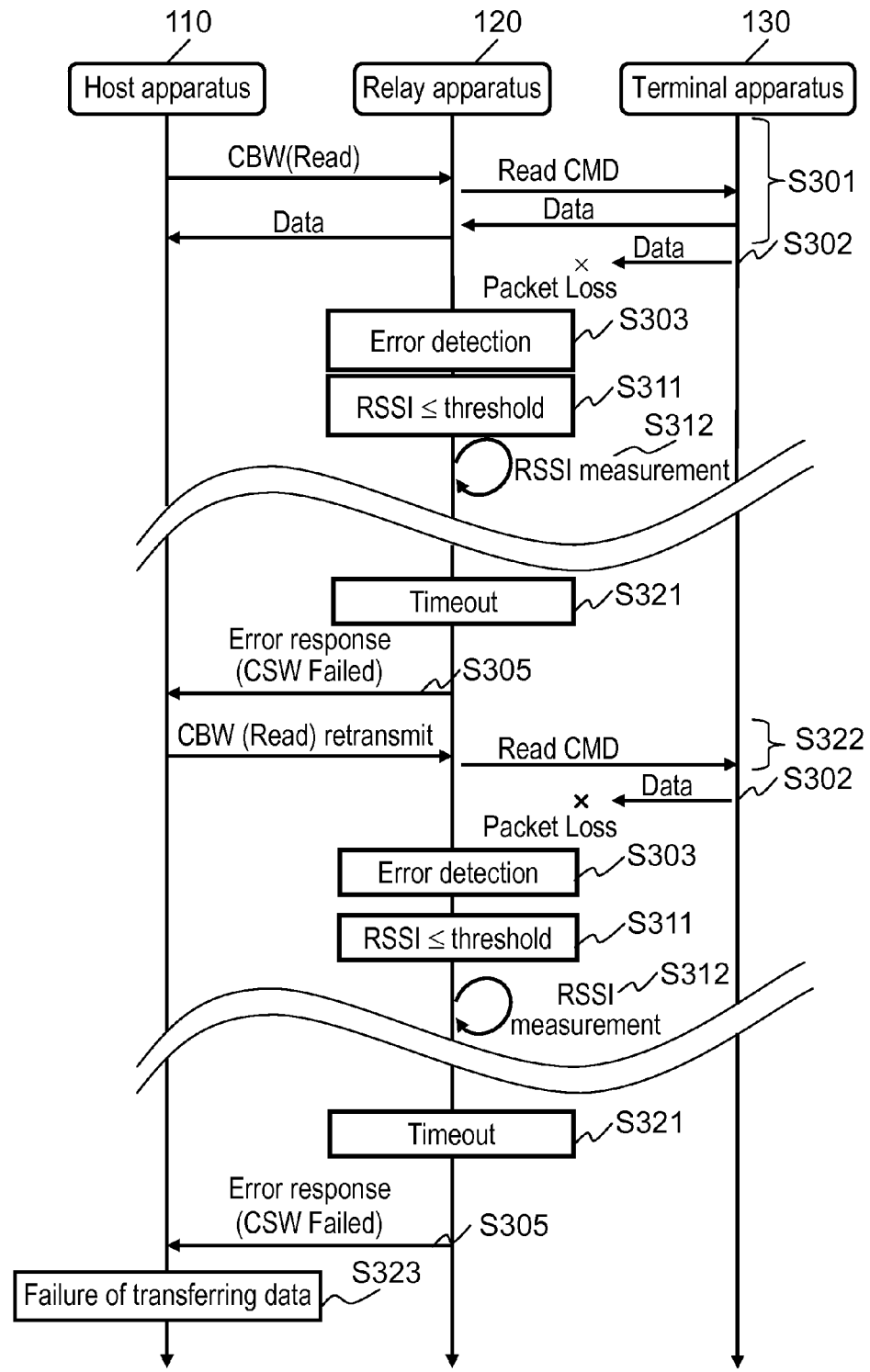
FIG. 5 shows a sequence diagram in which the relay apparatus according to the exemplary embodiment notifies the host apparatus of an error in a case where communication quality is not improved for a long time after detecting the error.

FIGS. 3 to 5 are sequence diagrams in a case where an error occurs in a WiGig communication between relay apparatus 120 and terminal apparatus 130 when host apparatus 110 receives data from terminal apparatus 130 through relay apparatus 120 in communication system 100. When an error occurs in the WiGig communication connecting relay apparatus 120 and terminal apparatus 130, relay apparatus 120 decides timing for notifying host apparatus 110 of the occurrence of the error. FIG. 3 is a sequence diagram showing a case where the communication quality is improved immediately after detecting the error, FIG. 4 is a sequence diagram showing a case where the communication quality is improved after a predetermined period has elapsed after detecting the error, and FIG. 5 is a sequence diagram showing a case where the communication quality is not improved for a long time after detecting the error. Case 1 in FIG. 3 will be described.

(S301) Host apparatus 110 transmits a command to instruct relay apparatus 120 to read data. The command corresponds to a Read command of the CBW in the protocol of the USB. Relay apparatus 120 transmits a reading data command (Read CMD), which is a request for transferring data, to terminal apparatus 130, using the WiGig communication in accordance with the received command. Terminal apparatus 130 received the reading data command from relay apparatus 120 reads appropriate data from within terminal apparatus 130 or a device connected to terminal apparatus 130, based on the reading data command. Terminal apparatus 130 transmits the read data (Data) to relay apparatus 120, using the WiGig communication. Relay apparatus 120 transmits, to host apparatus 110, the data (Data) transmitted from terminal apparatus 130.

(S302) When the communication quality of the WiGig communication deteriorates during transmitting the read data by terminal apparatus 130, transmitting of the data fails and packet loss (Packet Loss), which indicates loss of the data, occurs. In this case, relay apparatus 120 cannot receive the data (Data) transmitted from terminal apparatus 130.

(S303) When the packet loss occurs in 5302, relay apparatus 120 cannot receive the packet within the communication response latency, which is the upper limit of the latency for receiving. In this case, relay apparatus 120 detects an error.

Alternately, when the packet loss occurs, although relay apparatus 120 cannot receive the packet in which the packet loss occurred, relay apparatus 120 can receive another packet, for example, next data (Data) transmitted from terminal apparatus 130. In this case, relay apparatus 120 detects the error by sensing mismatching in which a value of the PSN included in the packet received previously and a value of the PSN included in the packet received subsequently by relay apparatus 120 are not successive, or the like.

(S304) Upon detecting the error in 5303, relay apparatus 120 determines timing for notifying host apparatus 110 of the error. Relay apparatus 120 checks the communication quality of the WiGig communication connected to terminal apparatus 130. Relay apparatus 120 determines the communication quality of the wireless communication, based on the information of the RSSI stored in memory 209, and the threshold information of the RSSI stored in threshold information storage 210.

As one example of determining the communication quality, Relay apparatus 120 compares the information of the communication quality to the threshold information of the RSSI. Relay apparatus 120 determines whether a value of the information of the RSSI is larger or smaller than a value of the threshold information of the RSSI. That is, relay apparatus 120 determines whether or not the communication quality is good, and relay apparatus 120 determines a communication state. In S304, the value of the information of the RSSI is larger than the value of the threshold information of the RSSI. That is, the communication quality is good.

As the example of determining the communication quality, relay apparatus 120 compares the extracted value of the information of the RSSI to the value of the threshold information of the RSSI. However, another example may be other than this example, and this example is not limited thereto.

(S305) When the communication quality is good in S304, relay apparatus 120 immediately notifies host apparatus 110 of the error (CSW Failed).

(S306) Host apparatus 110, which has received the error (CSW Failed), extracts an error factor not shown in FIG. 3, and then retransmits a command corresponds to a Read command of the CBW to reinstruct relay apparatus 120 to read data. Relay apparatus 120 transmits the reading data command (Read CMD), which is a request for transferring data, to terminal apparatus 130, using the WiGig communication in accordance with the received command. Terminal apparatus 130 received the reading data command from relay apparatus 120 reads the appropriate data from within terminal apparatus 130 or the device connected to terminal apparatus 130, based on the reading data command. Terminal apparatus 130 transmits the read data (Data) to relay apparatus 120, using the WiGig communication. Relay apparatus 120 transmits, to host apparatus 110, the data (Data) transmitted from terminal apparatus 130.

After relay apparatus 120 transmits, to host apparatus 130, all the data that requests to terminal apparatus 130, relay apparatus 120 notifies host apparatus 110 of a response indicating that transmitting all the data is completed, that is, a response of the success of the command (CSW Passed).

As described above, after relay apparatus 120 detects the error, communication between array apparatus 120 and terminal apparatus 130 restarts in a good condition of the communication quality. Therefore, array apparatus 120 transmits all the data, that re-requests to terminal apparatus 130, to host apparatus 110 without detecting an error such as a packet loss and the reading data command is easy relatively to succeed.

Next, case 2 in FIG. 4 will be described. Overlapping portions as in FIG. 3 assign the same reference numerals, and descriptions will be omitted.

First, processing in S301 to S303 is as described in FIG. 3, and thus, descriptions will be omitted.

(S311) Upon detecting the error in S303, relay apparatus 120 checks the communication quality, based on the information of the RSSI and the threshold information of the RSSI. This determining of the communication quality is the same as the determining of the communication quality described in FIG. 3. In S311, the value of the information of the RSSI is equal to or less than the value of the threshold information of the RSSI. That is, the communication quality is not good. When the communication quality is not good as just described, relay apparatus 120 immediately notifies host apparatus 110 of the error, and host apparatus 110 reinstructs relay apparatus 120 to read data. In this case, there is a high possibility that an error occurs again. Thus, when the communication quality is not good, relay apparatus 120 delays the notification of the error occurring between relay apparatus 120 and terminal apparatus 130 without immediately notifying host apparatus 110 of the relevant error.

(S312) When the communication quality is not good in S311, relay apparatus 120 monitors whether or not the value of the information of the RSSI between relay apparatus 120 and terminal apparatus 130 is larger than the value of the threshold information of the RSSI for a predetermined period, for example, 5 seconds have elapsed. Here, a wireless signal to extract the information of the RSSI may be extracted from a beacon packet, a probe response packet transmitted by terminal apparatus 130, or from a vendor-specific packet transmitted from terminal apparatus 130 for transmitting RSSI.

(S304) The communication quality between relay apparatus 120 and terminal apparatus 130 is improved in S304. In this example, relay apparatus 120 determines that communication quality between relay apparatus 120 and terminal apparatus 130 is improved before the predetermined period has elapsed.

Processing in S305 and S306 is as described in FIG. 3.

As described above, after relay apparatus 120 detects the error, relay apparatus 120 waits for the communication quality to be improved, and then the communication between array apparatus 120 and terminal apparatus 130 restarts in a good condition of the communication quality. Therefore array apparatus 120 transmits all the data that re-requests to terminal apparatus 130, to host apparatus 110 without detecting an error such as a packet loss and the reading data command is easy relatively to succeed.

Next, case 3 in FIG. 5 will be described. Overlapping portions as in FIGS. 3 and 4 assign the same reference numerals, and descriptions will be omitted.

First, processing in S301 to S303, S311, and S312 is as described in FIGS. 3 and 4, and thus, descriptions will be omitted.

(S321) When the communication quality between relay apparatus 120 and terminal apparatus 130 is not improved for predetermined period, for example, 5 seconds have elapsed in S312, a timeout (TimeOut) occurs in relay apparatus 120.

(S305) When the timeout occurs, relay apparatus 120 notifies to host apparatus 110 of an error (CSW Failed) regardless of the communication quality between relay apparatus 120 and terminal apparatus 130.

(S322) Host apparatus 110, which has received the error (CSW Failed), extracts an error factor not shown in FIG. 5, and then retransmits a command corresponds to a Read command of the CBW to reinstruct relay apparatus 120 to read data. Relay apparatus 120 transmits the reading data command (Read CMD), which is a request for transferring data, to terminal apparatus 130, using the WiGig communication in accordance with the received command.

(S302) Since the communication quality of the WiGig communication is not improved during transmitting the read data by terminal apparatus 130, the transmitting of the data fails, and a packet loss (Packet Loss), which indicates loss of the data, occurs. In this case, relay apparatus 120 cannot receive the data (Data) transmitted from terminal apparatus 130.

Furthermore, processing in S303, S311, S312, S321, and S305 is repeated predetermined times.

(S323) When notifying the error from relay apparatus 120 several times, for example, five times, host apparatus 110 determines a transfer error and terminates the Read command of the CBW as a failure of transferring data.

When notifying the error several times in one processing such as the Read command of the CBW, host apparatus 110 terminates the processing. Thus, an upper limit period, for monitoring whether or not the communication quality is improved, is provided, that is, a timeout is provided. Therefore host apparatus 110 can postpones terminating the Read command of the CBW.

Furthermore, an operation for initializing in the communication between host apparatus 110 and relay apparatus 120 can be suppressed. In the USB communication between host apparatus 110 and relay apparatus 120, when there is no response for the predetermined period in one processing such as the Read command of the CBW, host apparatus 110 instructs relay apparatus 120 to initialize.

Upon receiving the initialization instruction from host apparatus 110, relay apparatus 120 initializes not only the USB connection between host apparatus 110 and relay apparatus 120 but also the WiGig communication between relay apparatus 120 and terminal apparatus 130. Furthermore, a storage device connected to, or incorporated in terminal apparatus 130, other terminal apparatus connected to relay apparatus 120 other than terminal apparatus 130 are all initialized. More specifically, the whole communication system 100 is all initialized. Initializing the whole communication system 100 starts from establishment of the communication connection and a relatively long period is required for restarting. And host apparatus 110 cannot connect to terminal apparatus 130 during this period. Thus, even if the communication quality between relay apparatus 120 and terminal apparatus 130 is not good, initializing the whole communication system 100 is desired to be suppressed.

When in the USB communication with relay apparatus 120, there is no response for a predetermined period, for example, 30 seconds in one processing such as the Read command of the CBW, host apparatus 110 instructs to relay apparatus 120 to initialize. However, since the processing of the Read command has terminated, initializing relay apparatus 120 is suppressed.

Moreover, when receiving the error several times in one processing such as the Read command of the CBW, host apparatus 110 terminates a processing of transferring the data.

Figure 6:
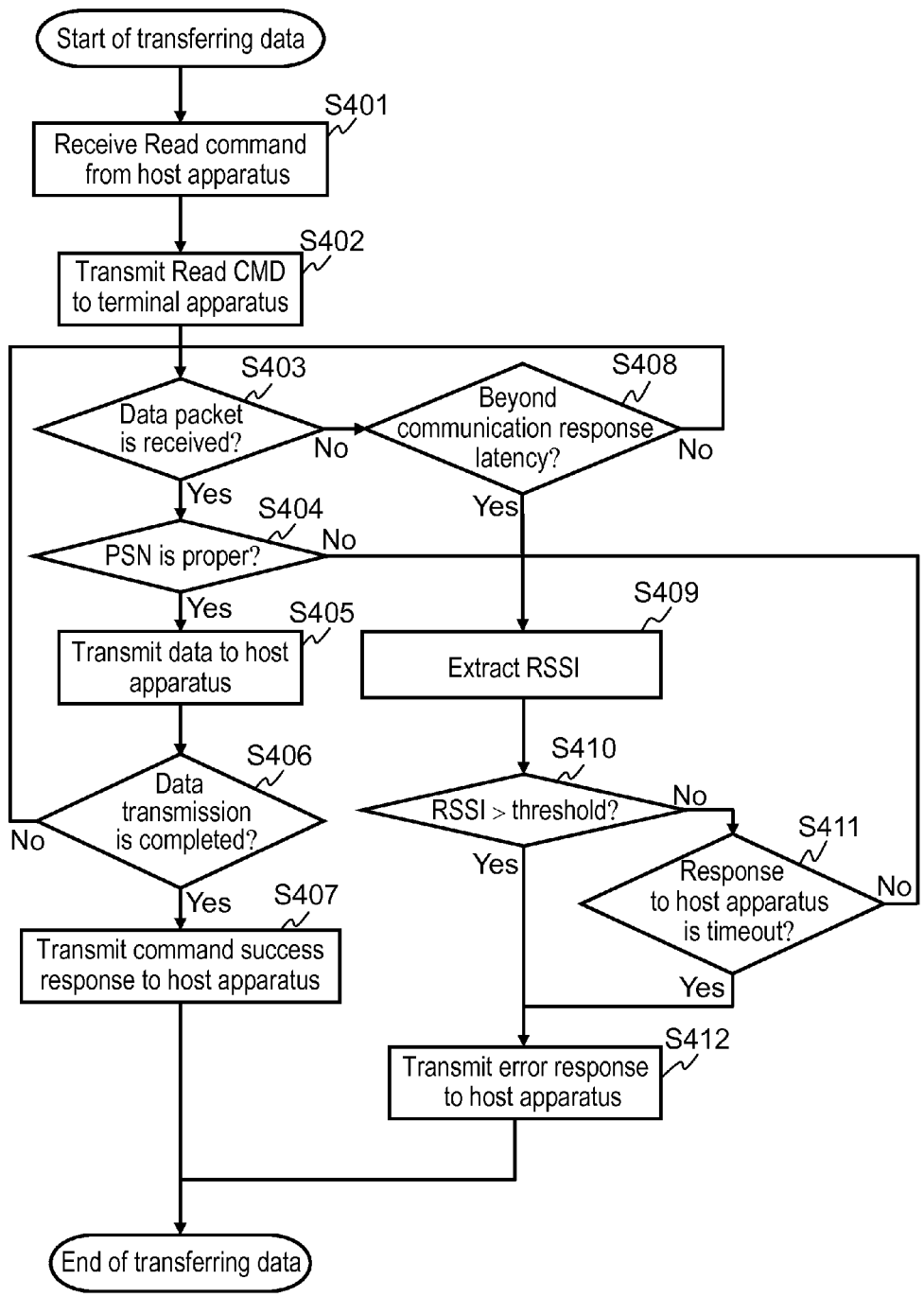
FIG. 6 is a flowchart showing one example of processing of the relay apparatus according to the exemplary embodiment.

FIG. 6 is a flowchart showing one example of the processing of relay apparatus 120 in the sequences shown in FIGS. 3, 4, and 5.

A case which host apparatus 110 receives data from terminal apparatus 130 will be described.

(S401) USB packet transceiver 201 receives the Read command of the CBW, which indicates the reading data command, from host apparatus 110. USB packet processor 202 decodes the received reading data command.

(S402) Wireless packet generator 203 generates a wireless packet to be transmitted to terminal apparatus 130. Wireless packet transceiver 204 converts the wireless packet generated by wireless packet generator 203 to a wireless signal to transmit the signal to terminal apparatus 130. This wireless packet is reading data command (ReadCMD) to terminal apparatus 130.

(S403) Wireless packet transceiver 204 waits for receiving a wireless signal of a data packet transmitted from terminal apparatus 130. If wireless packet transceiver 204 can receive the data packet from terminal apparatus 130 (Yes), the processing proceeds to S404. If wireless packet transceiver 204 cannot receive the data packet even after waiting for a predetermined period (No), the processing proceeds to S408.

(S404) Wireless packet processor 206 receives the data packet in S403 and checks a PSN of the packet. If the PSN is consistent with a PSN of a packet received before, for example if a PSN of a packet received immediately before and the PSN of the current packet received are consecutive (Yes), the processing proceeds to S405. On the other hand, if the PSN is not consistent with a PSN of a packet received before (No), wireless packet processor 206 determines that a packet loss occurs, and the processing proceeds to S409.

(S405) USB packet generator 208 generates a data packet in accordance with the USB protocol for host apparatus 110, based on the data packet received from terminal apparatus 130. USB packet transceiver 201 transmits the data packet generated by USB packet generator 208 to host apparatus 110.

(S406) USB packet generator 208 transmits, to host apparatus 110, all the data, as USB packets, requested by host apparatus 110 in the reading data command. If USB packet generator 208 completes to transmit all the data (Yes), then the processing proceeds to S407. If USB packet generator 208 does not complete to transmit all the data (No), the processing returns to S403.

(S407) When USB packet generator 208 completes to transmit the data read from terminal apparatus 130 normally, USB packet generator 208 generates a packet of a response (CSW Passed) notifying host apparatus 110 that the reading data command is successfully completed. USB packet transceiver 201 transmits the packet of the response generated by USB packet generator 208 to host apparatus 110.

(S408) When a packet loss occurs between relay apparatus 120 and terminal apparatus 130, wireless packet processor 206 cannot receive the data packet even after a predetermined period elapsed. Consequently, if current latency is within the communication response latency (No), the processing returns to S403. If wireless packet processor 206 cannot receive the data packet even after the communication response latency elapsed (Yes), the processing proceeds to S409.

(S409) When wireless packet processor 206 cannot receive the data packet or an error is detected by an inconsistency of the PSNs, error transmission determining unit 207 reads the information of the RSSI stored in memory 209. The information of the RSSI stored in memory 209 may be calculated from any packet such as the Beacon packet and the Probe Response packet, as long as the packet is transmitted by terminal apparatus 130. Moreover, the information of the RSSI may be calculated from a vender-specific packet transmitted by terminal apparatus 130.

(S410) Error transmission determining unit 207 compares a value of the read information of the RSSI and a value of the threshold information of the RSSI stored in threshold information storage 210 and determines a current communication state.

If the value of the information of the RSSI is larger than the value of the threshold information of the RSSI, that is, if the communication state is better than a predetermined state (Yes), the processing immediately proceeds to S412 and error transmission determining unit 207 notifies host apparatus 110 of the error. On the other hand, if the value of the information of the RSSI is equal to or less than the value of the threshold information of the RSSI (No), the processing proceeds to S411.

(S411) While waiting for the communication quality between relay apparatus 120 and terminal apparatus 130 to be improved without notifying the error, error transmission determining unit 207 checks whether or not the duration of non-response to host apparatus 110 is within a predetermined period, that is, whether or not a timeout for a response to host apparatus 110 occurs. If the timeout occurs (Yes), the processing proceeds to S412 and error transmission determining unit 207 immediately notifies host apparatus 110 that the error occurred in the communication between relay apparatus 120 and terminal apparatus 130. If the timeout does not occurs (No), the processing returns to S409 and transmission determining unit 207 check the communication quality again.

(S412) USB packet generator 208 generates a packet to notify host apparatus 110 of the error by the instruction of error transmission determining unit 207. USB packet transceiver 201 transmits, to host apparatus 110, the packet for notifying the error generated by USB packet generator 208.

Figure 7:
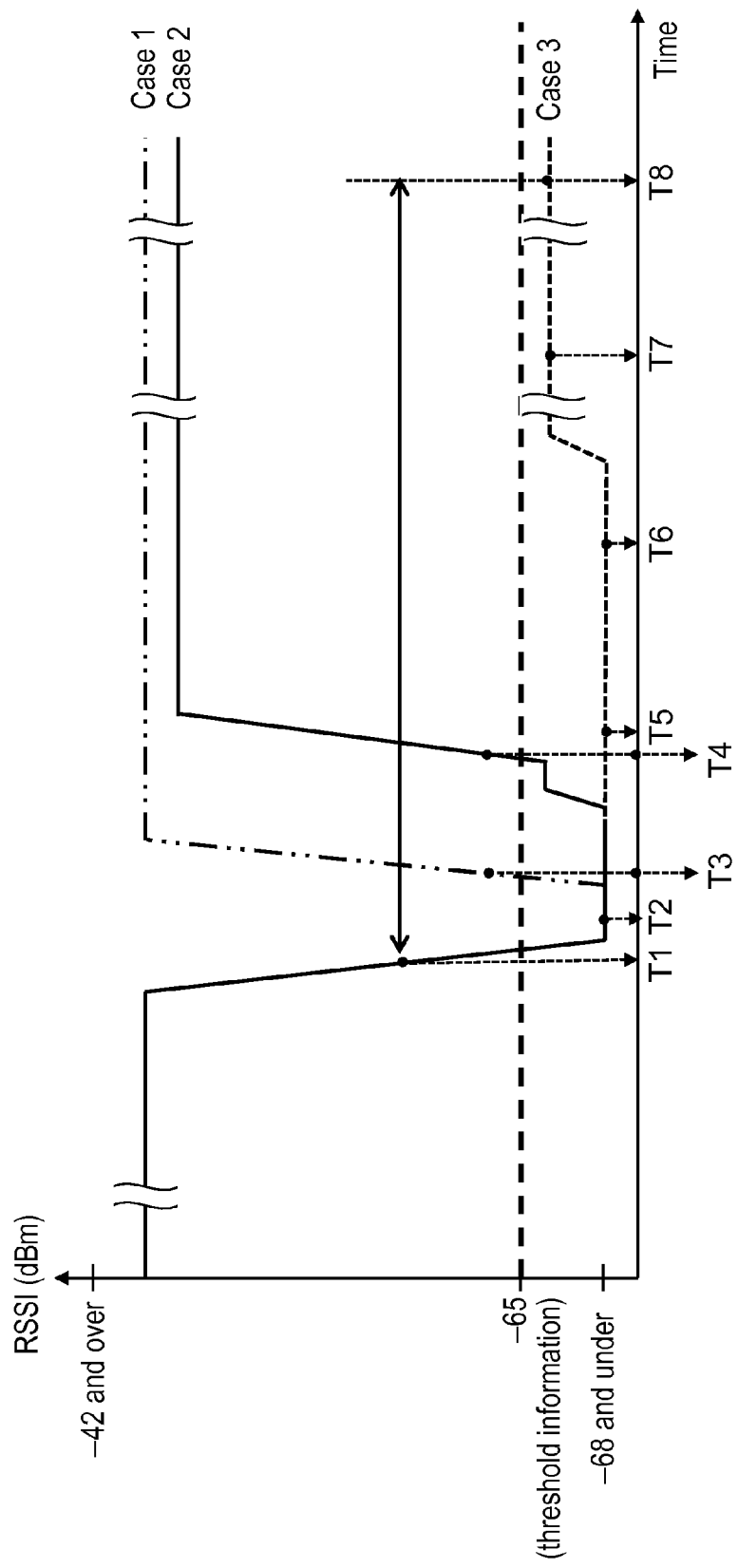
FIG. 7 is a diagram showing transition of information of an RSSI with respect to time in the exemplary embodiment.

FIG. 7 is a diagram showing transition of the information of the RSSI with respect to time in the cases described in FIGS. 3 to 5. A horizontal axis of a graph indicates time, and a vertical axis of the graph indicates the value of the information of the RSSI. A long two-dot chain line in the graph shows case 1, a solid line shows case 2, and a dotted line shows case 3.

In FIG. 7, the value of the threshold information of the RSSI is −65 dBm. When the value of the information of the RSSI is larger than −65 dBm, the communication quality is good. When the value of the information of the RSSI is equal to or less than −65 dBm, the communication quality is not good.

In S301, host apparatus 110 transmits the command to instruct relay apparatus 120 to read data. In response to this command, relay apparatus 120 transmits, to host apparatus 110, the data (Data) transmitted from terminal apparatus 130. A time when host apparatus 110 receives the data is T1.

In S302, the packet loss occurs, and relay apparatus 120 detects an error. A time when this error is detected is T2.

In case 1 described in FIG. 3, a time when the communication quality is good in the determining the communication quality in S304 and the error is notified, is T3.

In case 2 described in FIG. 4 and case 3 described in FIG. 5, in the determining the communication quality in S311, the communication quality is not good, and relay apparatus 120 monitors whether or not the value of the information of the RSSI between relay apparatus 120 and terminal apparatus 130 is larger than the value of the threshold information of the RSSI in S312.

In case 2 described in FIG. 4, a time when the communication quality is improved and the error is notified is T4.

In case 3 described in FIG. 5, a time when the timeout occurs in S321 and relay apparatus 120 notifies host apparatus 110 of the error regardless of the communication quality between relay apparatus 120 and terminal apparatus 130, is T5. Furthermore, after relay apparatus 120 receives the command of the CBW (Read command) to reinstruct the reading data, the communication quality is not improved, a timeout occurs again in S321, and notifying the error repeats several times. These times are T6 and T7. When host apparatus 110 receives the error from relay apparatus 120 several times, for example, five times, host apparatus 110 determines a transfer error and terminate the Read command of the CBW as a failure of transferring data. In the USB communication between host apparatus 110 and relay apparatus 120, when there is no response for the predetermined period in one processing such as the Read command of the CBW, host apparatus 110 instructs relay apparatus 120 to initialize. T8 is a time when there was no response from time T1.

As described above, relay apparatus 120 is connected to host apparatus 110 by the first communication method, and to terminal apparatus 130 by the second communication method, and which transmits data to terminal apparatus 130 and receives data from terminal apparatus 130 in accordance with an instruction from host apparatus 110. And relay apparatus 120 includes communication quality measuring unit 205 configured to extract a communication quality of the second communication method, wireless packet processor 206 configured to detect an error in connection with terminal apparatus 130, and error transmission determining unit 207 configured to change timing of notifying host apparatus 110 of in accordance with the communication quality extracted in communication quality measuring unit 205.

Furthermore, the first communication method is a wired communication method, and the second communication method is a wireless communication method.

Thereby, this constitution enables host apparatus 110, which has been notified of the error, to retransmit a command of reading data to relay apparatus 120 at better timing without grasping a communication state between relay apparatus 120 and terminal apparatus 130. As a result, success rate of the reading data can be increased.

Furthermore, in relay apparatus 120, error transmission determining unit 207 immediately notifies host apparatus 110 of the error, when a value of the communication quality is larger than the threshold value, and delays notification of the error to host apparatus 110, when the value of the communication quality is equal to or smaller than the threshold.

That is, the timing when relay apparatus 120 notifies host apparatus 110 of the error, delays more as if the communication state between relay apparatus 120 and terminal apparatus 130 is not good. Relay apparatus 120 notifies host apparatus 110 of the error when the communication state is not good, and there is a high possibility that host apparatus 110 transmits the reading data command or the like again without considering the communication state between relay apparatus 120 and terminal apparatus 130. And host apparatus 110 transmits the reading data command when the communication state is not good, and there is a low possibility that host apparatus 110 receives data normally.

Thus, relay apparatus 120 delays notification of the error to host apparatus 110 until the communication state between relay apparatus 120 and terminal apparatus 130 is improved. Relay apparatus 120 notifies host apparatus 110 of the error after the communication state is improved. In this case, the communication state is improved, host apparatus 110 retransmits the reading data command to relay apparatus 120, and the success percentage for reading data is higher.

Furthermore, in relay apparatus 120, error transmission determining unit 207 notifies host apparatus 110 of the error within a predetermined period. When the response latency exceeds the upper limit period, relay apparatus 120 notifies host apparatus 110 of the error, even though the communication state between relay apparatus 120 and terminal apparatus 130 is not improved. This constitution can suppress unnecessary reset processing of the whole system.

While in the present exemplary embodiment, the case using the reading data command (CSW (Read command)) is described, the present disclosure is not limited thereto. As with the reading data command, another case using a writing data command may be employed. That is, any command, for accessing from relay apparatus 120 to terminal apparatus 130 in accordance with a command from host apparatus 110, may be used.

Moreover, while in the present embodiment, relay apparatus 120 is described as hardware, the present disclosure is not limited thereto. Part of algorism may be implemented in software or the like. Moreover, a programmable hardware device such as a logic array may be used, or algorism may be implemented as an integrated circuit.

What is claimed is:

1. A relay apparatus which is connected to a host apparatus by a first communication method and to a terminal apparatus by a second communication method, and which transmits data to the terminal apparatus and receives data from the terminal apparatus in accordance with an instruction from the host apparatus, the relay apparatus comprising:
   a communication quality measuring unit configured to extract communication quality of the second communication method;
   a packet processor configured to detect an error in connection with the terminal apparatus; and
   an error transmission determining unit configured to change timing of notifying the host apparatus of the error detected in the packet processor in accordance with the communication quality extracted in the communication quality measuring unit,
   wherein the error transmission determining unit notifies the host apparatus of the error within a predetermined period when the communication quality is larger than a threshold value, and
   wherein the error transmission determining unit delays notification of the error to the host apparatus when the communication quality is equal to or smaller than the threshold value.

2. The relay apparatus according to claim 1, wherein
the first communication method is a wired communication method, and
the second communication method is a wireless communication method.

3. A method for controlling a relay apparatus which is connected to a host apparatus by a first communication method and to a terminal apparatus by a second communication method, and which transmits data to the terminal apparatus and receives data from the terminal apparatus in accordance with an instruction from the host apparatus, the method comprising:
   extracting communication quality of the second communication method;
   detecting an error of the connection with the terminal apparatus; and
   changing timing of notifying the host apparatus of the error detected in the step of detecting in accordance with the communication quality extracted in the step of extracting,
   wherein the relay apparatus notifies the host apparatus of the error within a predetermined period when the communication quality is larger than a threshold value, and
   wherein the relay apparatus delays notification of the error to the host apparatus when the communication quality is equal to or smaller than the threshold value.

* * * * *